US009094321B2

(12) United States Patent
DeCusatis et al.

(10) Patent No.: US 9,094,321 B2
(45) Date of Patent: Jul. 28, 2015

(54) ENERGY MANAGEMENT FOR COMMUNICATION NETWORK ELEMENTS

(71) Applicant: International Business Machines Corporation, Armonk, NY (US)

(72) Inventors: Casimer M. DeCusatis, Poughkeepsie, NY (US); Rajaram B. Krishnamurthy, Wappingers Falls, NY (US); Michael Onghena, Poughquag, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/733,162

(22) Filed: Jan. 3, 2013

(65) Prior Publication Data

US 2014/0185621 A1 Jul. 3, 2014

(51) Int. Cl.
*H04L 12/721* (2013.01)

(52) U.S. Cl.
CPC .................................. *H04L 45/124* (2013.01)

(58) Field of Classification Search
CPC .................................................... H04L 45/124
See application file for complete search history.

(56) References Cited

U.S. PATENT DOCUMENTS 8,046,602 B2  10/2011  Mani et al.

OTHER PUBLICATIONS

Amir-Mohammad Rahmani et al; Forecasting-based Dynamic Virtual Channels Allocation for Power Optimization of Network-on-Chips;2009 22nd International Conference on VLSI Design, ISBN: 978-07695-3506-7; Jan. 19, 2009;IEEE.
Amir-Mohammad Rahmani et al;Power-Aware Noc Router Using Central Forecasting-Based Dynamic Virtual Channel Allocation; Proceedings of 2010 IEEE International Symposium on Circuits and Systems (ISCAS), ISBN: 978-4244-5308-5; Aug. 3, 2010; IEEE.

*Primary Examiner* — Dang Ton
*Assistant Examiner* — Kevin Lee
(74) *Attorney, Agent, or Firm* — Keivan Razavi; Steven Chiu (57) ABSTRACT

A method of managing data flow may include assigning, along a communication route, a predetermined total energy consumption limit for a network adaptor having a first and a second network adaptor port card, whereby the route transmits data between a first and a second node within the network. Along the route, a total energy consumption value for the network adaptor is determined based on the transmitted data. The assigned total energy consumption limit is compared with the determined total energy consumption value of the network adaptor. The transmitted data is determined as being data of a known duration and data of an unknown duration based on the comparing resulting in the determined total energy consumption value exceeding the assigned total energy consumption limit. The data of a known duration is transferred from the first network adaptor to the second network adaptor and the first network adaptor is powered off.

19 Claims, 7 Drawing Sheets

ENERGY MANAGEMENT FOR COMMUNICATION NETWORK ELEMENTS

BACKGROUND a. Field of the Invention

The present invention generally relates to communication networks, and particularly, to managing energy consumption within network communication equipment.

b. Background of Invention

Communication equipment such as network adaptors, routers, and switches are responsible for conveying data from one user to an intended other user using various communication protocols. Routing protocols, which determine how routers and/or switches communicate with each other across a communication network, may spread the flow of data traffic across various routers/switches/adaptors in order to reduce data latency. However, such a reduction of data latency may be accomplished at the expense of an increase in energy consumption within the routers/switches/adaptors in the data path.

It may, therefore, be advantageous, among other things, to manage the consumption of energy by the various elements of a communications network such as routers, switches, network adaptors, etc.

BRIEF SUMMARY

According to at least one exemplary embodiment, a method of managing data flow in a communication network may include selecting an energy efficient route for transmitting data between a first and a second node within the communication network and determining energy consumption values for each network adaptor port card and each network switch port card located along the energy efficient route. Predetermined energy consumption limits for each network adaptor port card and each network switch port card located along the energy efficient route may be assigned, whereby the determined energy consumption values are compared with the respective assigned predetermined energy consumption limits. The data is determined, at a hop along the route, as being one of data of a known duration and data of an unknown duration based on the comparing resulting in one of the determined energy consumption values exceeding a corresponding one of the predetermined energy consumption limits corresponding to a first network adaptor port card of a network adaptor device at the hop. A second network adaptor port card of the network adaptor device carrying the data of an unknown duration is then determined such that, the data of an unknown duration is transferred from the second network adaptor port card to the first network adaptor port card.

According to at least one other exemplary embodiment, a processor-implemented method of managing data flow between a first node and a second node within a communication network may include selecting an energy efficient route for transmitting data between a first and a second node within the communication network, and determining energy consumption values for each network adaptor port card and each network switch port card located along the energy efficient route. Predetermined energy consumption limits for each network adaptor port card and each network switch port card located along the energy efficient route may be assigned, whereby the determined energy consumption values are compared with the respective assigned predetermined energy consumption limits. The data is determined, at a hop along the route, as being one of data of a known duration and data of an unknown duration based on the comparing resulting in one of the determined energy consumption values exceeding a corresponding one of the predetermined energy consumption limits corresponding to a first network adaptor port card of a network adaptor device at the hop. A second network adaptor port card of the network adaptor device carrying the data of an unknown duration is then determined such that, the data of an unknown duration is transferred from the second network adaptor port card to the first network adaptor port card.

According to at least one other exemplary embodiment, a computer program product for managing data flow between a first node and a second node within a communication network is provided. The computer program product may include a computer readable storage medium readable by a processing circuit that stores instructions for execution by the processing circuit for performing a method that includes selecting an energy efficient route for transmitting data between a first and a second node within the communication network, and determining energy consumption values for each network adaptor port card and each network switch port card located along the energy efficient route. Predetermined energy consumption limits for each network adaptor port card and each network switch port card located along the energy efficient route may be assigned, whereby the determined energy consumption values are compared with the respective assigned predetermined energy consumption limits. The data is determined, at a hop along the route, as being one of data of a known duration and data of an unknown duration based on the comparing resulting in one of the determined energy consumption values exceeding a corresponding one of the predetermined energy consumption limits corresponding to a first network adaptor port card of a network adaptor device at the hop. A second network adaptor port card of the network adaptor device carrying the data of an unknown duration is then determined such that, the data of an unknown duration is transferred from the second network adaptor port card to the first network adaptor port card.

According to at least one other exemplary embodiment, a method of managing data flow in a communication network may include assigning, along a communication route, a predetermined total energy consumption limit for a network adaptor device having a first and a second network adaptor port card, whereby the communication route transmits data between a first and a second node within the communication network. Along the communication route, a total energy consumption value for the network adaptor device is determined based on the transmitted data. The assigned total energy consumption limit is then compared with the determined total energy consumption value of the network adaptor device. The transmitted data is determined as being one of data of a known duration and data of an unknown duration based on the comparing resulting in the determined total energy consumption value exceeding the assigned total energy consumption limit. The data of a known duration is then transferred from the first network adaptor device to the second network adaptor device and the first network adaptor device is powered off.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The described exemplary embodiment describes the management of energy consumption across communication networks by assigning and monitoring energy budgets for various communications equipment along a communication path.

The described exemplary embodiments are directed to the management of energy consumption across communication networks by assigning and monitoring energy budgets (i.e., an energy management scheme) for various communications equipment along one or more communication paths.

Figure 1:
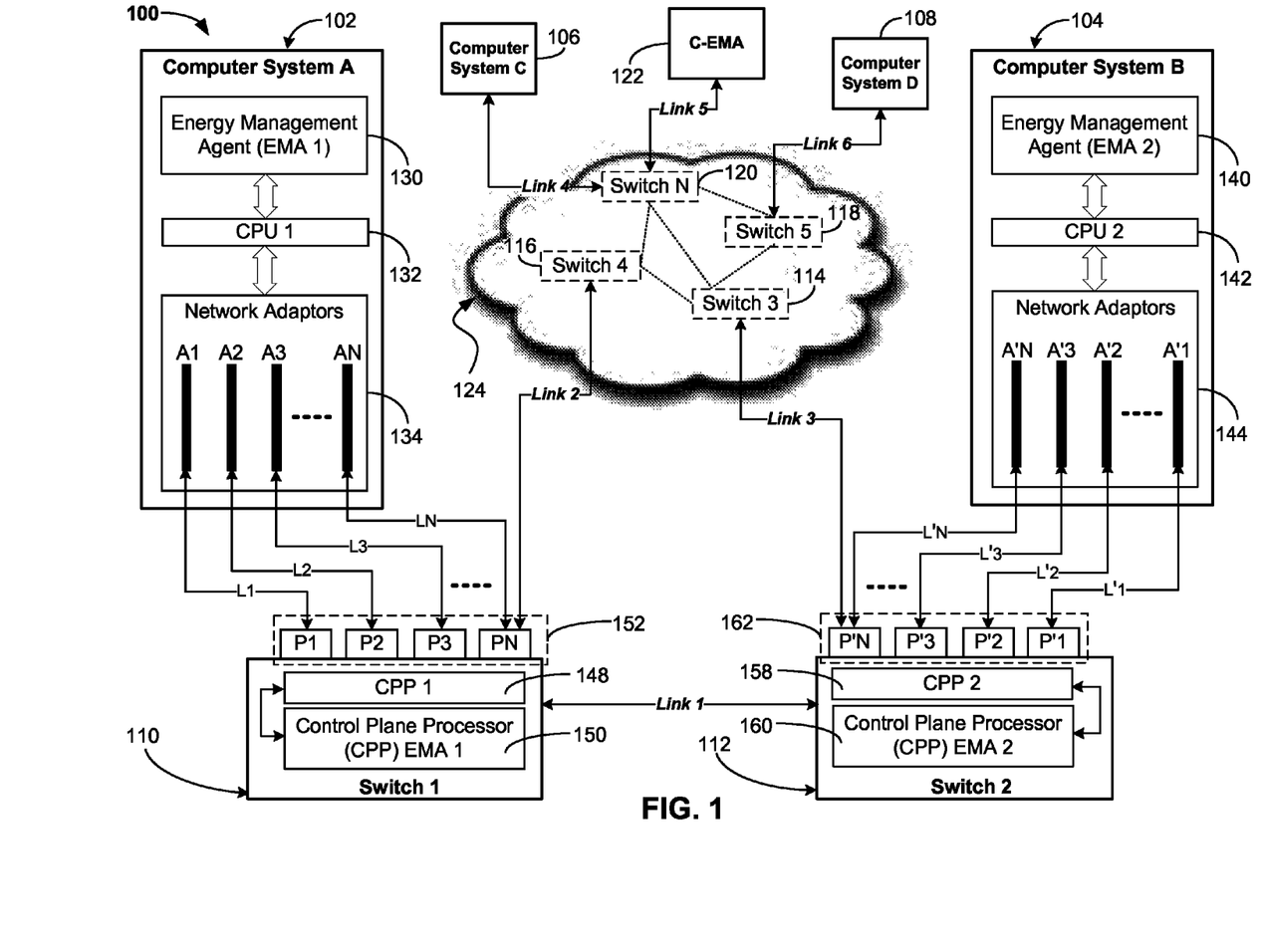
FIG. 1 is a block diagram of a communication system employing an energy management scheme according to one or more exemplary embodiments.

Referring to FIG. 1, a block diagram of a communication system 100 employing an energy management scheme according to an exemplary embodiment is depicted. The communication system 100 may, for example, include computer systems 102, 104, 106, and 108; switch devices 110, 112, 114, 116, 118, and 120, a central energy management agent 122; and communication network 124. According to some implementations, computer systems 102, 104, 106, and 108 may, for example, include computer data centers that send (sender-end node) and/or receive (receiver-end node) data flows, while communication network 124 may, for example, include a Storage Area Network (SAN).

Computer system 102 may include an energy management agent (EMA) component 130, a central processing unit (CPU) 132 in communication with the EMA component 130, and network adaptors 134 for transmitting and receiving data between switch device 110 and CPU 132. As depicted, the network adaptors 134 may include a plurality network adaptor port cards A1-AN each having input/output ports for receiving and transmitting data. In some implementations, the energy management agent (EMA) component 130 may be software or firmware running on a dedicated processor device (e.g., microprocessor). In other implementations, the energy management agent (EMA) component 130 may be incorporated within, and executed by, the CPU 132. The EMA component 130 may monitor and manage the energy consumption of the network adaptor port cards A1-AN utilized over one or more communication routes. Details of the operation of an example EMA component such as EMA 130 are described below with the aid of FIGS. 2A-2C.

Similarly, computer system 104 may include an energy management agent (EMA) component 140, a central processing unit (CPU) 142 in communication with the EMA component 140, and network adaptors 144 for transmitting and receiving data between switch device 112 and CPU 142. As depicted, the network adaptors 144 may include a plurality of network adaptor port cards A1-AN each having input/output ports for receiving and transmitting data. In some implementations, the energy management agent (EMA) component 140 may be software or firmware running on a dedicated processor device (e.g., microprocessor). In other implementations, the energy management agent (EMA) component 140 may be incorporated within and executed by the CPU 142. Computer systems 106 and 108 may be identical or similar to computer systems 102 or 104. The EMA component 140 may monitor and manage the energy consumption (i.e., Energy Consumption (Wh)=Power (W)×Time (hours)) of the network adaptor port cards A'1-A'N utilized over one or more communication routes. Details of the operation of an example EMA component such as EMA 140 are described below with the aid of FIGS. 2A-2C.

Switch device 110 may include a control plane processor (CPP) 148, a control plane processor EMA component 150, and switch cards 152 for transmitting and receiving data between network adaptor port cards A1-AN and other switch devices (e.g., Switch 1 and Switch 4). As depicted, the switch cards 152 may include a plurality of switch port cards P1-PN each having input/output ports for receiving and transmitting data between, for example, respective network adaptor port cards A1-AN over links L1-LN. The plurality of switch port cards P1-PN may also provide connectivity with other switch devices. For example, switch port card PN may provide a communication link (i.e., Link 2) between switch 110 and switch 116 over communication network 124. The control plane processor EMA component 150 may monitor and manage the energy consumption of the switch port cards P1-PN utilized over one or more communication routes. Details of the operation of an example EMA component such as EMA 150 are described below with the aid of FIG. 2A-2C.

Also, switch device 112 may include a control plane processor (CPP) 158, a control plane processor EMA component 160, and switch cards 162 for transmitting and receiving data between network adaptor port cards A'1-A'N and other switch devices (e.g., Switch 2 and Switch 3). As depicted, the switch cards 162 may include a plurality of switch port cards P'1-P'N each having input/output ports for receiving and transmitting data between, for example, respective network adaptor port cards A'1-A'N over links L'1-L'N. The plurality of switch port cards P'1-P'N may also provide connectivity with other switch devices. For example, switch port card P'N may provide a communication link (i.e., Link 3) between switch 112 and switch 114 over communication network 124. The control plane processor EMA component 160 may monitor and manage the energy consumption of the switch port cards P'1-P'N utilized over one or more communication routes. Details of the operation of an example EMA component such as EMA 160 are described below with the aid of FIGS. 2A-2C. Switch devices 114-120 may be identical or similar to switch devices systems 110 or 112.

According to some implementations, a central EMA component (C-EMA) 122 may be in communication with and manage the operation of EMA components 130, 140, 150, and 160 via network 124. Thus, the C-EMA component 122 may run on a dedicated computer device and provide configuration data to, and receive status information from, the other EMA components 130, 140, 150, 160. According to other implementations, for example, any one of EMA components 130, 140, 150, and 160 may act as a central EMA component, whereby allocation of EMA components 130, 140, 150, and 160 as a central EMA component may be accomplished dynamically based various user-defined conditions. For example, one user-defined condition may include assigning a particular EMA component 130, 140, 150, 160 as a central EMA component based on the EMA residing at a sender-end location. According to another example, a user-defined condition may include assigning a particular EMA component 130, 140, 150, 160 as a central EMA component based on the EMA residing at a receiver location. According to yet another example, a user-defined condition may include assigning a particular EMA component 130, 140, 150, 160 as a central EMA component based on the amount of data traffic handled at the EMA component location.

As previously indicated, the EMA components may, among other things, monitor and manage energy consumption within the network adaptor port cards and switch port cards. Thus, energy metering devices (e.g., energy metering integrated circuit devices) may be used in connection with the network adaptor port cards and switch port cards in order to determine their instantaneous energy consumption values.

As shown in FIG. 1, switch devices 110-120 are in communication. Some switches may be directly coupled to each other, such as switch device 110 and switch device 112. In such an implementation, the switches 110, 112 may be located in the same physical location. Alternatively, some switches may be coupled to each other via communication network 124. For example, switch device 110 may connect to switches 116 and 120 via communications network 124, whereby the communication network may, for example, include a local area network (LAN), metropolitan area network (MAN), or wide area network (WAN) of either a wireless or wired type.

Figure 2A:
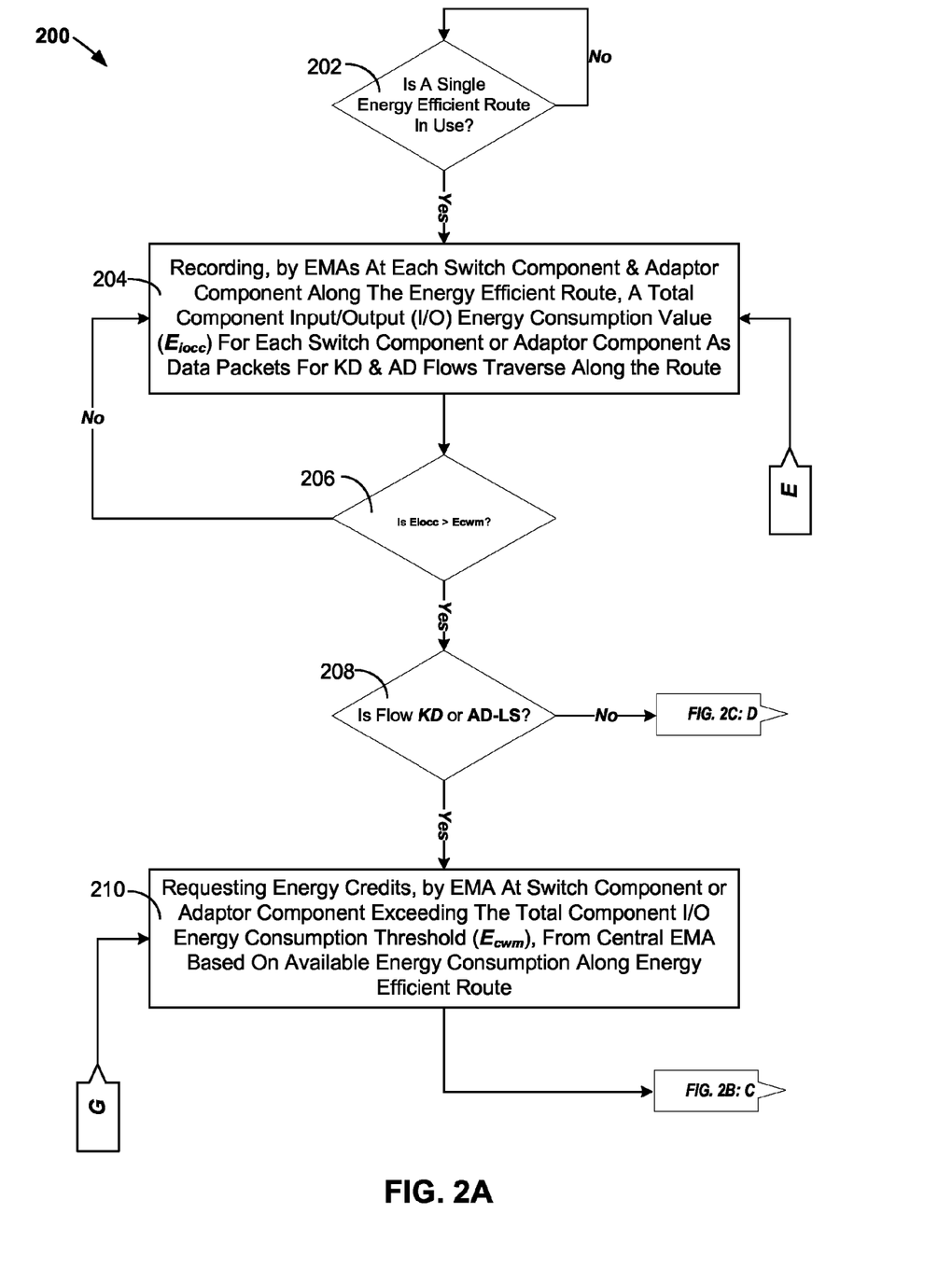
FIGS. 2A-2C are operational flow diagrams of a reverse pruning energy management scheme according to one exemplary embodiment.
Figure 2B:
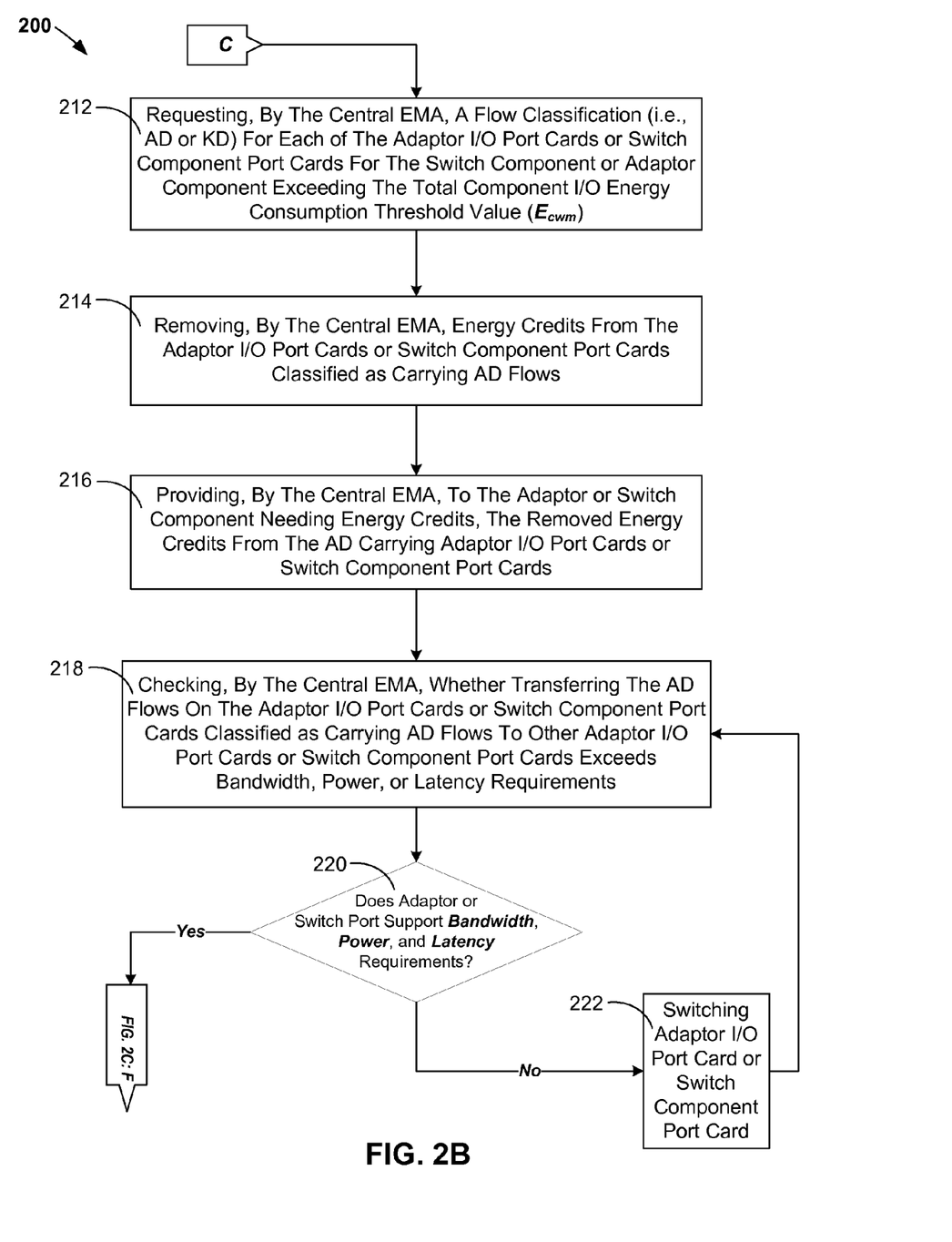
Figure 2C:
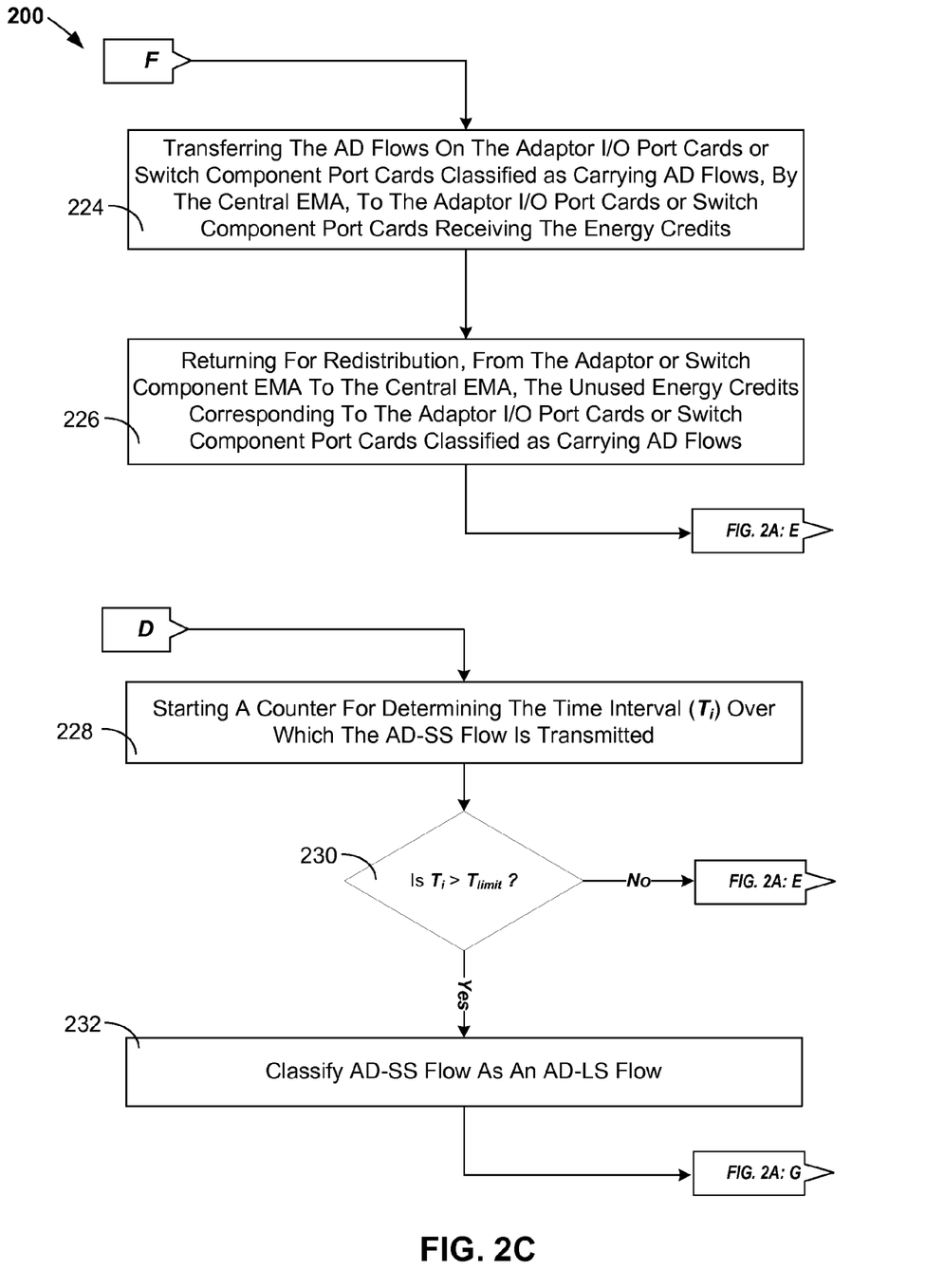

FIGS. 2A-2C are operational flow diagrams of a reverse pruning energy management scheme according to one exemplary embodiment. In a reverse pruning energy management scheme, energy consumption monitoring and energy consumption changes along an already established communication route are facilitated. Accordingly, in the reverse pruning energy management scheme, data traffic may be consolidated with respect to input/output (I/O) port cards of switches and network adaptor devices along the communications route. FIGS. 2A-2C are described with the aid of the communication system 100 illustrated in FIG. 1.

At 202, a single energy efficient route is in use, whereby known-duration (KD) data and/or arbitrary (unknown-duration) data (AD) flows may be transmitted between a sender-end node (e.g., computer system 102) and a receiver-end node (e.g., computer system 104). A KD data flow may, for example, include data that is associated with a known service, which may be profiled. For example, KD flows may include, but are not limited to, data from sensors, information stored in a database, data generated by an application program, etc. Another category of data is arbitrary data (AD) flows, which may include data traffic that is bursty and of an unknown and arbitrary duration such as web traffic. AD data flows are not profiled. The energy efficient route may have been determined by a variety of criteria. For example, the route may have been selected as result of the end-to-end power consumption value staying below a predetermined power consumption limit or based on guidance from an external software entity like IBM® Active Energy Manager™. The single energy efficient communication route may be established between computer system 102 and computer system 104 via switches 110 and 112 over link 1.

Once the route is in use (202), at 204 the EMA components at each switch device and network adaptor device along the route may record a total I/O energy consumption value ($E_{iocc}$) for each of the switch and network adaptor devices, as KD and/or AD data flows through them. The total I/O energy consumption value for each of the switch and network adaptor devices may be determined as the total energy consumption values for the network adaptor port cards of each network adaptor device and the total energy consumption values for the switch port cards of each switch device, respectively. For example, along the energy efficient route, the KD and AD data flows may be transmitted by computer 102 through network adaptor port cards A1, A2, and A3 of network adaptor device 134, switch port cards P1, P2, and P3 of switch device 110, switch port cards P'1, P'2, and P'3 of switch device 112, and network adaptor port cards A'1, A'2, and A'3 of network adaptor device 144. At network adaptor device 134, the EMA 130 of computer system 102 may record the total I/O energy consumption value for data flowing through network adaptor port cards A1, A2, and A3. At switch device 110, the EMA 150 of switch device 110 may record the total I/O energy consumption value for data flowing through switch port cards P1, P2, and P3. Also, at switch device 112, the EMA 160 of switch device 112 may record the total I/O energy consumption value for data flowing through switch port cards P'1, P'2, and P'3. At network adaptor device 144, the EMA 140 of computer system 104 may record the total I/O energy consumption value for data flowing through network adaptor port cards A'1, A'2, and A'3.

At 206, it may be determined whether the total I/O energy consumption value ($E_{iocc}$) at each of network adaptor devices 134 and 144, and switch devices 110 and 112 along the route, exceed their respective predetermined threshold or watermark values ($E_{cwm}$). If the respective threshold or watermark values ($E_{cwm}$) are not exceeded, data along the route continues to flow while the EMA components 130, 140, 150, 160 continue to record the total I/O energy consumption values ($E_{iocc}$) at 204.

Alternatively, if along the route, a respective threshold or watermark value ($E_{cwm}$) is exceeded, at 208 it may be determined whether the data flowing through the switch or network adaptor that exceeded the watermark is either KD data, or AD data that may be processed as KD data. AD data that may be processed as KD data may be referred to as long-span arbitrary data (AD-LS). AD data that is not processed as KD data may be referred to as short-span arbitrary data (AD-SS).

For example, the file size of the AD data may determine whether a received AD data flow may be classified as either an AD-SS flow or an AD-LS flow. If the file size is determined to be greater than a predetermined threshold, the AD data may, for example, be classified as an AD-LS flow. If the file size is determined to be less than a predetermined threshold on the other hand, the AD data may be classified as an AD-SS flow.

According to another example, the workload of the AD data may be used to determine whether the data flow may be classified into either an AD-SS flow or an AD-LS flow. The workload may be determined by, for example, a particular application program that generates data. Based on the application program, each workload may be classified as generating either an AD-SS flow or an AD-LS flow. For example, Application-X may be designated as generating a workload having AD-LS data, while Application-Y may be designated as generating a workload having AD-SS data. According to yet another example, the size of the AD data that is buffered and back logged (BL) by a data buffer associated with the sender end system or node (e.g., FIG. 1: computer system 102) may be utilized to determine whether the received data may be classified as either an AD-SS flow or an AD-LS flow. In such an implantation, the percentage of the buffer that is full may be used in the determination of AD-SS or AD-LS flows. If, for example, the AD data fills over 70% of the buffer, it may be classified as an AD-LS flow.

If it is determined that the data is KD or AD-LS data (208), at 210 the EMA at the switch or network adaptor device that has exceeded the total I/O energy consumption threshold values ($E_{cwm}$) may request energy credits from the central EMA based on the available energy consumption along the energy efficient route. Energy credits may be a predefined energy consumption value that may be assigned to any switch or network adaptor device that has exceeded its total I/O energy consumption threshold values ($E_{cwm}$). The predefined energy consumption value constituting available energy credits may be designated by a network administrator. For example, 20 KWh of energy credits may be designated as being available for use along a communication route. If a switch along the route exceeds its energy consumption threshold by 10 KWh, from the 20 KWh of energy credits, 10 KWh of energy credit may be assigned to the switch.

Referring to FIG. 2B, at 212, the central EMA may request a flow classification (i.e., KD, AD-LS) for each switch port card or each network adaptor port card for the respective switch device or network adaptor device along the route (i.e., at a hop) that exceeds its total I/O energy consumption threshold value ($E_{cwm}$). For example, the EMA 130 of the sender-end computer system 102 may act as a central EMA. The EMA 150 at switch device 110 may detect that its total I/O energy consumption threshold value ($E_{cwm}$) has been exceeded (204, 206). If switch 110 carries KD or AD-LS data flows (208), EMA 150 may send a request for energy credits from EMA 130 (i.e., acting as a central EMA) (210). In an alternative implementation, however, EMA 150 may send a request for energy credits from C-EMA 122 (210). Upon receiving the request for energy credits (210), the EMA 130 (i.e., acting as a central EMA) may request a flow classification from the EMA 150 at switch device 110 (212). The switch EMA 150 may then accordingly classify the data flows through switch port cards P1-P4. For example, switch EMA 150 may classify the data flows through switch port card P1 as being KD and AD-LS flows, and the data flows through switch port card P2 as being only AD-LS flows (212). The EMA 150 at the switch may then send the data flow classification for the port cards P1, P2 back to the requesting central EMA 130.

At 214, the central EMA 130 sends a command to the switch EMA 150 instructing the switch EMA to remove energy credits from the network adaptor port card or switch port card carrying only the AD-LS flows. For example, since port card P2 carries only AD-LS flows, energy credits associated with this port card (i.e., P2) are removed by the central EMA 130 via switch EMA 150.

At 216, the central EMA then initiates the transfer of the removed energy credits to the network adaptor or switch device needing the energy credits. In the above example, switch device 110 may need energy credits and, therefore, the central EMA 130 may send the removed energy credits corresponding to port card P2 to switch EMA 150. The switch EMA 150 transfers the removed energy credits corresponding to port card P2 to switch port card P1, which carries the KD and AD-LS flows.

At 218, the central EMA checks to determine whether the transferring of the AD-LS data flows from the adaptor or switch port card carrying only the AD-LS flows, to the other adaptor or switch port card carrying the KD flows, exceeds the other adaptor or switch port card's operating parameters such as power, bandwidth, or latency requirements. For example, the central EMA 130 may check to determined whether transferring the AD-LS flows from port card P2 to port card P1 does not exceed the power, bandwidth, or latency requirements associated with port card P1.

If, at 220, it is determined that the KD data carrying network adaptor port or switch port card does not support its power, bandwidth, or latency requirements, then another network adaptor port or switch port card carrying KD data flows on the network adaptor or switch device is selected (222). For example, if port card P1 fails to support its power, bandwidth, or latency requirements, then another switch port card (e.g., P3) carrying KD data on switch 110 may be selected.

Referring to FIG. 2C, if at 220 (FIG. 2B), it is determined that the network adaptor port card or switch port card carrying the KD data supports its power, bandwidth, or latency requirements after the data flow transfer (i.e., AD-LS), then at 224, the AD-LS data on the network adaptor port card or the switch port card carrying only the AD-LS data are transferred, by the central EMA, to the network adaptor port card or the switch port card carrying KD data. For example, when it is determined that the switch port card P1 supports its power, bandwidth, or latency requirements based on receiving the AD-LS data that is transferred from port card P2, then at 224, the AD-LS data on switch port P2 is transferred, by the central EMA 130, to switch port P1. In some implementations, the central EMA 130 may initiate the transfer of the AD-LS data on switch port P2 to switch port P1 via switch EMA 150. According to other implementations, the central EMA 130 may directly initiate the transfer of the AD-LS data on switch port P2 to switch port P1. Thus, at a hop along the route, by consolidating the AD data flows of switch/network-adaptor port cards carrying only AD data with the switch/network-adaptor port cards carrying the KD flows, the total energy consumption value of the switch or network adaptor device is reduced.

At 226, based on the data flow transfer and the resulting reduction in the total energy consumption value of the switch or network adaptor device, the corresponding switch or network adaptor EMA may return, to the central EMA, any unused energy credits associated with the switch port card or network adaptor port card carrying the AD flows. For example, if the switch EMA 150 determines that the switch 110 requires 50 KWh of energy credits based on exceeding its total threshold value, the transfer of the AD data flow from port card P2 to port card P1 may cause a reduction of 70 KWh of energy consumption. Thus 20 KWh (i.e., 70 KWh-50 KWh=20 KWh) of energy credits are now available for returning, by switch EMA 150, to the central EMA 130. The 20 KWh of energy credits can now be redistributed by the central EMA 130 along the route as needed.

If, at 208 (FIG. 2A), it is determined that the data is AD-SS data, at 228 a counter may be started for specifying the time interval (Ti) over which the AD-SS flow is transmitted. For example, if the data flowing through switch port PN of switch 110 is determined, by the switch EMA 150, to be AD-SS data, the switch EMA 150 may start a counter in order to determine the time interval over which the AD-SS data is flowing through port card PN. At 230, if the time interval generated by the counter is less than a predetermined time limit ($T_{limit}$), the process returns to 204 (FIG. 2A), where the EMA components at each switch device and network adaptor device along the route may record a total I/O energy consumption value ($E_{iocc}$) for each of the switch and network adaptor devices, as KD and/or AD data flows through them.

If, at 230, the time interval generated by the counter is greater than the predetermined time limit ($T_{limit}$), then at 232, the AD-SS data flow is classified as an AD-LS flow and the process returns to 210 (FIG. 2A), where the EMA at the switch or network adaptor device that has exceeded the total I/O energy consumption threshold values ($E_{cwm}$) may request energy credits from the central EMA based on the available energy consumption along the energy efficient route.

It may be appreciated that once the port cards carrying AD-SS data flows have their data flows transferred to other cards on the switch or network adaptor, power may be removed from the port card in order to place the port card in a shut-down mode. It will be understood that upstream adapters and port cards will appropriately steer flows so that new port card assignments to flows may be accordingly observed. Placing one or more port cards in shut-down mode contributes to a reduction in energy consumption, since the port card power consumption may be significantly reduced.

In an alternative implementation, however, once the route is in use (202), at 204 and 206, the EMA components at each switch device and network adaptor device along the route may record an I/O energy consumption value ($E_{io\_port\_card}$) for each individual port card of the switch and network adaptor devices, as KD and/or AD data flows through them. In contrast, here the energy consumption monitoring is carried out at an individual port card level rather than at a network adaptor component or switch component level. For example, along the energy efficient route, the KD and AD data flows may be transmitted by computer 102 through network adaptor port cards A1, A2, and A3 of network adaptor device 134, switch port cards P1, P2, and P3 of switch device 110, switch port cards P'1, P'2, and P'3 of switch device 112, and network adaptor port cards A'1, A'2, and A'3 of network adaptor device 144. At network adaptor device 134, the EMA 130 of computer system 102 may record the I/O energy consumption value for data flowing through each of network adaptor port cards A1, A2, and A3. At switch device 110, the EMA 150 of switch device 110 may record the I/O energy consumption value for data flowing through each of switch port cards P1, P2, and P3. Also, at switch device 112, the EMA 160 of switch device 112 may record the I/O energy consumption value for data flowing through each of switch port cards P'1, P'2, and P'3. At network adaptor device 144, the EMA 140 of computer system 104 may record the I/O energy consumption value for data flowing through each of network adaptor port cards A'1, A'2, and A'3. In such an alternative implementation, it may be determined whether the I/O energy consumption values ($E_{io\_port\_card}$) for each port card of network adaptor devices 134 and 144, and switch devices 110 and 112 along the route, exceed their respective predetermined threshold or watermark values ($E_{port\_card\_wm}$). If the respective threshold or watermark values ($E_{cwm}$) are not exceeded, data along the route continues to flow while the EMA components 130, 140, 150, 160 continue to record the I/O energy consumption values ($E_{io\_port\_card}$) for each port card at 204. The remaining processes may be identical or similar to 208-232.

Figure 3A:
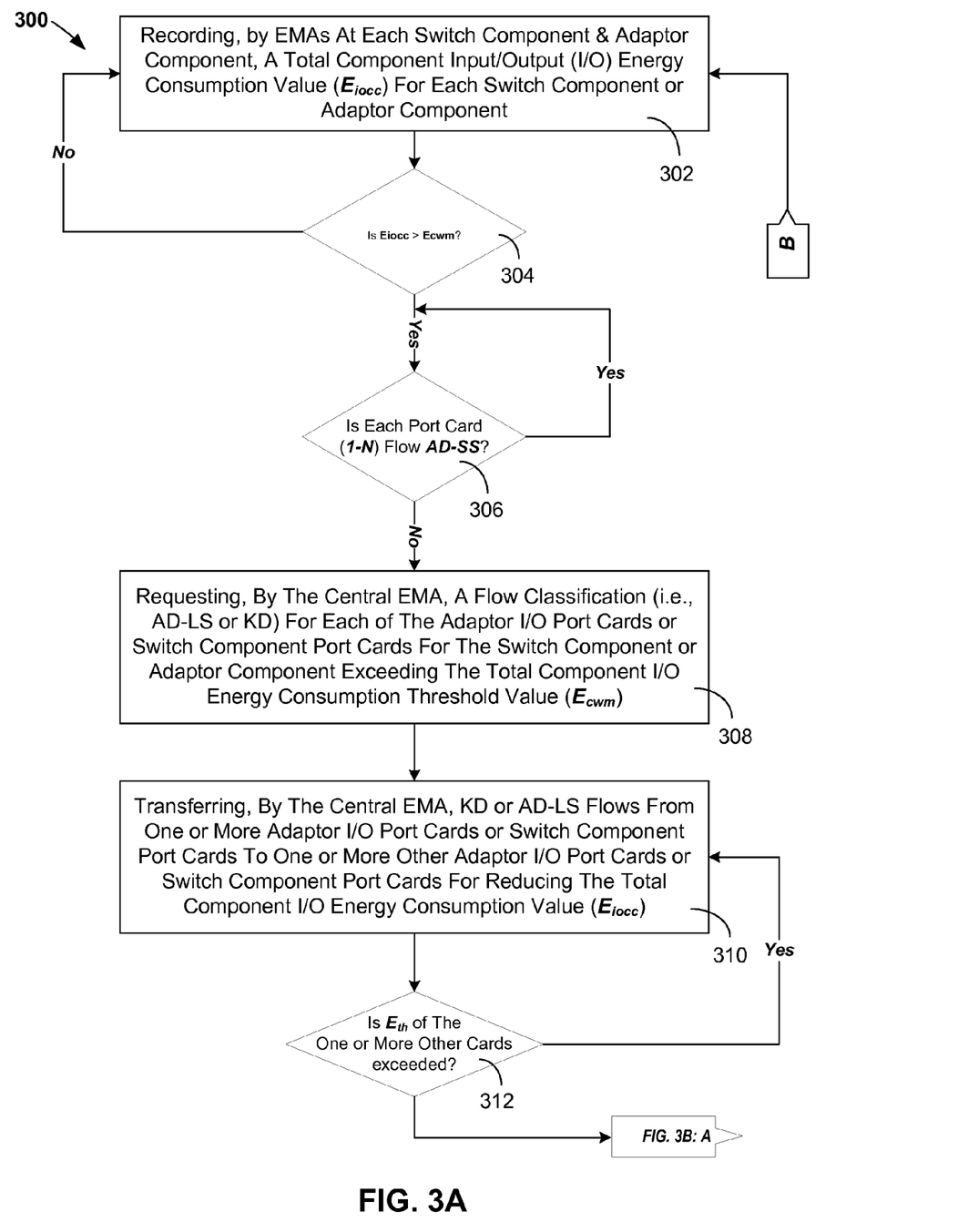
FIGS. 3A-3B are operational flow diagrams of a reverse pruning energy management scheme according to another exemplary embodiment.
Figure 3B:
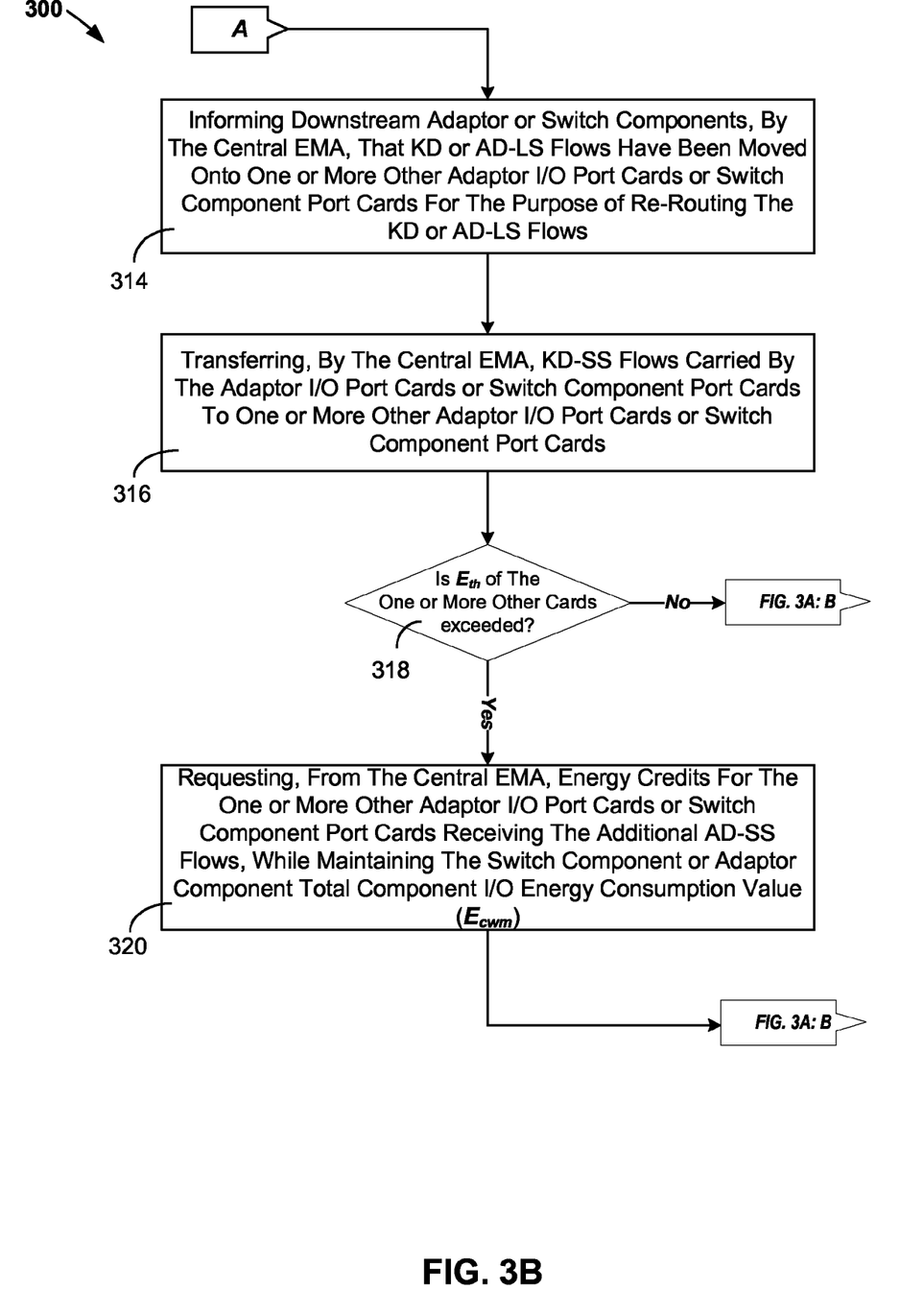

FIGS. 3A-3B are operational flow diagrams 300 of a reverse pruning energy management scheme according to another exemplary embodiment. At 302 the EMA components at each switch device and network adaptor device along the route may record a total I/O energy consumption value ($E_{iocc}$) for each of the switch and network adaptor devices, as KD and/or AD data flows through them. The total I/O energy consumption value for each of the switch and network adaptor devices may be determined as the total energy consumption values for the network adaptor port cards of each network adaptor device and the total energy consumption values for the switch port cards of each switch device, respectively. For example, along the route, the KD and AD data flows may be transmitted by computer 102 to computer 104 through network adaptor port cards A1, A2, and A3 of network adaptor device 134, switch port cards P1, P2, and P3 of switch device 110, switch port cards P'1, P'2, and P'3 of switch device 112, and network adaptor port cards A'1, A'2, and A'3 of network adaptor device 144. At network adaptor device 134, the EMA 130 of computer system 102 may record the total I/O energy consumption value for data flowing through network adaptor port cards A1, A2, and A3. At switch device 110, the EMA 150 of switch device 110 may record the total I/O energy consumption value for data flowing through switch port cards P1, P2, and P3. Also, at switch device 112, the EMA 160 of switch device 112 may record the total I/O energy consumption value for data flowing through switch port cards P'1, P'2, and P'3. At network adaptor device 144, the EMA 140 of computer system 104 may record the total I/O energy consumption value for data flowing through network adaptor port cards A'1, A'2, and A'3.

At 304, it may be determined whether the total I/O energy consumption value ($E_{iocc}$) at each of network adaptor devices 134 and 144, and switch devices 110 and 112 along the route, exceed their respective predetermined threshold or watermark values ($E_{cwm}$). If the respective threshold or watermark values ($E_{cwm}$) are not exceeded, data along the route continues to flow while the EMA components 130, 140, 150, 160 continue to record the total I/O energy consumption values ($E_{iocc}$) at 302.

Alternatively, if along the route (i.e., at a particular hop), a respective threshold or watermark value ($E_{cwm}$) is exceeded, at 306 it may be determined whether the data flowing through any one of the port cards of the switch or network adaptor that exceeded the watermark is only short-span arbitrary data (AD-SS). As previously indicated, AD data that may be processed as KD data may be referred to as long-span arbitrary data (AD-LS). However, AD data that is not processed as KD data (e.g., bursty type Internet traffic) may be referred to as short-span arbitrary data (AD-SS). If a port card carries only AD-SS data flows, the next port card on the switch or network adaptor is tested until all the port cards have been polled in order to determine whether they carry AD-SS data.

As with the above example, the file size of the AD data may determine whether a received AD data flow may be classified as either an AD-SS flow or an AD-LS flow. If the file size is determined to be greater than a predetermined threshold, the AD data may, for example, be classified as an AD-LS flow. If the file size is determined to be less than a predetermined threshold on the other hand, the AD data may be classified as an AD-SS flow. According to another example, the workload of the AD data may be used to determine whether the data flow may be classified into either an AD-SS flow or an AD-LS flow. The workload may be determined by, for example, a particular application program that generates data. Based on the application program, each workload may be classified as generating either an AD-SS flow or an AD-LS flow. For example, Application-X may be designated as generating a workload having AD-LS data, while Application-Y may be designated as generating a workload having AD-SS data. According to yet another example, the size of the AD data that is buffered and back logged (BL) by a data buffer associated with the sender end system or node (e.g., FIG. 1: computer system 102) may be utilized to determine whether the received data may be classified as either an AD-SS flow or an AD-LS flow. In such an implantation, the percentage of the buffer that is full may be used in the determination of AD-SS or AD-LS flows. If, for example, the AD data fills over 70% of the buffer, it may be classified as an AD-LS flow.

If a port card is detected that does not carry AD-SS flows only (306), then at 308, the central EMA may request a flow classification (i.e., KD, AD-LS) for each switch port card or each network adaptor port card for the respective switch device or network adaptor device along the route (i.e., at a hop) that exceeds its total I/O energy consumption threshold value ($E_{cwm}$). For example, the EMA 130 of the sender-end computer system 102 may act as a central EMA. The EMA 150 at switch device 110 may detect that its total I/O energy consumption threshold value ($E_{cwm}$) has been exceeded (204, 206). The EMA 130 (i.e., acting as a central EMA) may then request a flow classification from the EMA 150 at switch device 110 (308). The switch EMA 150 may then accordingly classify the data flows through switch port cards P1-PN. For example, switch EMA 150 may classify the data flows through switch port card P1 as being KD and AD-LS flows, and the data flows through switch port card P2 as being only AD-LS flows (308). The EMA 150 at the switch may then send the data flow classification for the port cards P1, P2 back to the requesting central EMA 130. Thus, the central EMA 130 is now apprised of the port cards that carry either KD or AD-LS data.

At 310, the AD-LS and/or KD data on one or more of the network adaptor port cards or switch port cards are transferred, by the central EMA, to one or more other network adaptor port cards or switch port cards in order to reduce the total component I/O energy consumption value ($E_{iocc}$). For example, the AD-LS data on switch port P2 may be transferred, by the central EMA 130, to switch port P1. In some implementations, the central EMA 130 may initiate the transfer of the AD-LS data on switch port P2 to switch port P1 via switch EMA 150. According to other implementations, the central EMA 130 may directly initiate the transfer of the AD-LS data on switch port P2 to switch port P1. Thus, at a hop along the route, by consolidating the KD and/or AD-LS data flows of the switch/network-adaptor port cards with other switch/network-adaptor port cards, the total energy consumption value of the switch or network adaptor device is reduced.

Once the data flows are transferred (310), at 312 the individual energy consumption threshold value(s) of the one or more other network adaptor port cards or switch port cards receiving the transferred KD and/or AD-LS data flows are determined. If the individual energy consumption threshold value(s) of the one or more other network adaptor port cards or switch port cards receiving the transferred KD and/or AD-LS data flows is exceeded, then the process returns to 310, and, thus, another network adaptor port card or switch port card may be selected for receiving the transferred KD and/or AD-LS data flows.

If, at 312, the individual energy consumption threshold value(s) of the one or more other network adaptor port cards or switch port cards receiving the transferred KD and/or AD-LS data flows is not exceeded, then at 314, the central EMA may inform the down stream network adaptors or switches that the KD and/or AD-LS flows have been moved onto one or more other port cards (i.e., on network adaptor or switch) for the purpose of re-routing the transferred KD and/or AD-LS flows. For example, now that the AD-LS data flows are transferred from P2 to P1, the downstream switch 112 and network adaptor 144 are informed of this data transfer by the central EMA 130. For example, the respective EMA components 160, 140 of downstream switch device 112 and downstream computer system 104 may be informed of the data transfer. The EMAs may then convey this information to their respective equipment processor devices. For example, the switch EMA 160 may convey the data transfer information to control plane processor (CPP1) 148. Also, the computer system EMA 140 may convey the data transfer information to its CPU 142.

At 316, the AD-SS data flows that may have been determined on one or more port cards at 306, are transferred, by the central EMA, to the one or more other network adaptor port cards or the switch port cards carrying KD and/or AD-LS data. For example, based on P3 carrying only AD-SS data, the AD-SS data on P3 may be transferred, by central EMA 130, to P1.

At 318, the individual energy consumption threshold value (s) of the one or more other network adaptor port cards or switch port cards receiving the transferred AD-SS data flows are determined. If the individual energy consumption threshold value(s) of the one or more other network adaptor port cards or switch port cards receiving the transferred AD-SS data flows is exceeded, then at 320, energy credits are requested from the central EMA. For example, if the transfer of the AD-SS data on P3, by central EMA 130, to P1 causes the individual energy consumption threshold value of P1 to be exceeded, then at 320, energy credits may be requested by central EMA 130. If at 318, the individual energy consumption threshold value(s) of the one or more other network adaptor port cards or switch port cards receiving the transferred AD-SS data flows is not exceeded, then the process returns to 302, whereby the EMA components at each switch device and network adaptor device along the route continue to record the total I/O energy consumption value ($E_{iocc}$) for each of the switch and network adaptor devices, as KD and/or AD data flows through them.

At 320, energy credits may be requested, from the central EMA, by the switch or network adaptor device EMA based on the detection of a threshold violation in the individual energy consumption threshold value(s) of the one or more other network adaptor port cards or switch port cards receiving the transferred AD-SS data flows. For example, the EMA 150 of switch 110 may request energy credits from central EMA 130 based on the switch EMA 150 detecting a violation in the individual energy consumption threshold value of port card P1 following the transfer of the AD-SS data from port card P3. The central EMA 130 may, for example, send a command to the switch EMA 150 instructing the switch EMA 150 to remove energy credits from the network adaptor port cards or switch port cards carrying AD-SS flows and/or AD-LS/KD flows. For example, since the AD-LS data flows were transferred from port card P2 to port card P1, energy credits associated with this port card (i.e., P2) are removed by the central EMA 130 via switch EMA 150. Additionally, since the AD-SS data flows were transferred from port card P3 to port card P1, energy credits associated with this port card (i.e., P3) are also removed by the central EMA 130 via switch EMA 150.

For example, if the switch EMA 150 determines that the switch port P1 requires 50 KWh of energy credits based on exceeding its individual threshold value, the transfer of the data flows from port cards P2 and P3 to port card P1 may cause a reduction of, for example, 100 KWh of energy consumption. Thus 50 KWh (i.e., 100 KWh-50 KWh=50 KWh) of energy credits are now available for returning, by switch EMA 150, to the central EMA 130. As previously described, the 50 KWh of remaining energy credits can now be redistributed by the central EMA 130 along the route as needed.

According to another implementation, the route may be designated a predetermined amount of energy credits, which may be stored in the central EMA and accordingly distributed to the network adaptor and switch device EMAs upon an energy credit request. For example, along the route which transmits KD and AD data flows between computer 102 and computer 104 through network adaptor device 134, switch devices 110 and 112, and network adaptor device 144, a predetermined energy credit value of, for example, 100 KWh may be assigned. Thus, when the switch port P1 requires 50 KWh of energy credits based on exceeding its individual energy consumption threshold value, the 50 KWh may be requested and provided from the 100 KWh predetermined energy credit value. As previously described, the 50 KWh of remaining energy credits can now be redistributed by the central EMA 130 along the route as needed.

At 320, once the energy credits have been provided, then the process returns to 302, whereby the EMA components at each switch device and network adaptor device along the route continue to record the total I/O energy consumption value ($E_{iocc}$) for each of the switch and network adaptor devices, as KD and/or AD data flows through them.

It may be appreciated that once the port cards carrying AD-SS and AD-LS/KD data flows have their data flows transferred to other cards on the switch or network adaptor, power may be removed from the port card in order to place the port card in a shut-down mode. Upstream switches and ports are appropriately configured to steer flows to active switch ports and adapter cards. Placing one or more port cards in shut-down mode contributes to a reduction in energy consumption, since the port card power consumption may be significantly reduced.

Figure 4:
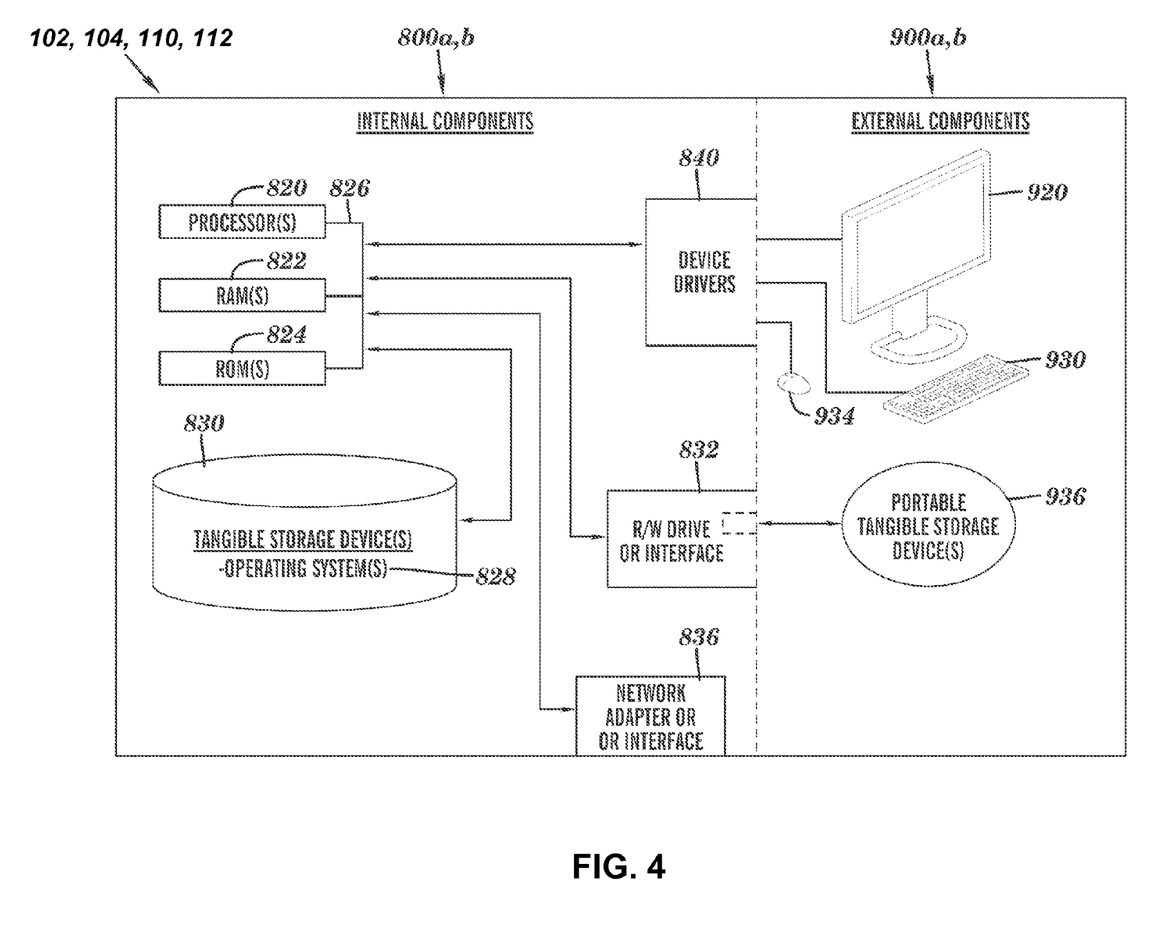
FIG. 4 is a block diagram of hardware and software within the computer(s) of FIG. 1 in accordance with an embodiment of the present invention.

FIG. 4 shows a block diagram of the components of a data processing system 800, 900, such as computing devices 102, 104, 110, and 112 (FIG. 1) in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing devices 102, 104, 110, and 112 (FIG. 1) may include respective sets of internal components 800 *a, b, c* and external components 900 *a, b, c* illustrated in FIG. 4. Each of the sets of internal components 800 *a, b, c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs in respective computing devices 102, 104, 110, and 112 (FIG. 1) is stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The EMA component programs 200 (FIGS. 2A-2C), 300 (FIG. 3A-3B) associated with computing devices 102, 104, 110, and 112 (FIG. 1) can be stored on one or more of the respective portable computer-readable tangible storage devices 936, read via the respective R/W drive or interface 832 and loaded into the respective hard drive 830.

Each set of internal components 800 a, b, c may also include network adapters (or switch port cards) or interfaces 836 such as a TCP/IP adapter cards, wireless wi-fi interface cards, or 3G or 4G wireless interface cards or other wired or wireless communication links. EMA component programs 200 (FIGS. 2A-2C) and 300 (FIG. 3A-3B), in computing devices 102, 104, 110, and 112 (FIG. 1) can be downloaded to computing devices 102, 104, 110, and 112 (FIG. 1) from an external computer (e.g., server) via a network (for example, the Internet, a local area network or other, wide area network) and respective network adapters or interfaces 836. From the network adapters (or switch port adaptors) or interfaces 836, the EMA component programs 200 (FIGS. 2A-2C) and 300 (FIG. 3A-3B) associated with computing devices 102, 104, 110, and 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method of managing data flow in a communication network, comprising:

selecting an energy efficient route for transmitting data between a first and a second node within the communication network;

determining energy consumption values for each network adaptor port card and each network switch port card located along the energy efficient route;

assigning predetermined energy consumption limits for each network adaptor port card and each network switch port card located along the energy efficient route;

comparing the determined energy consumption values with the respective assigned predetermined energy consumption limits;

determining, at a hop along the route, the data as being one of data of a known duration and data of an unknown duration based on the comparing resulting in one of the determined energy consumption values exceeding a respective one of the predetermined energy consumption limits corresponding to a first network adaptor port card of a network adaptor device at the hop;

determining a second network adaptor port card of the network adaptor device carrying the data of an unknown duration; and transferring the data of an unknown duration from the second network adaptor port card to the first network adaptor port card.

2. The method of claim 1, further comprising:
requesting energy credits for the first network adaptor port card based on the one of the determined energy consumption values exceeding the one of the predetermined energy consumption limits for the first adaptor port card.

3. The method of claim 2, further comprising:
transferring, from the second network adaptor port card, the requested energy credits to the first adaptor port card; and
re-routing the data of an unknown duration from upstream adaptors and switches to the first adaptor port card based on turning off the second network adaptor port card.

4. The method of claim 3, further comprising:
transmitting the data flow of known duration and the transferred data of an unknown duration along the energy efficient route from the first node to the second node via the first network adaptor port card.

5. The method of claim 3, further comprising:
determining remaining energy credits based on subtracting the requested energy credits requested for the first network adaptor port card from energy credits provided by the second network adaptor port card.

6. The method of claim 1, wherein upon the determining of the data as the data of an unknown duration, a count value is commenced for the transmission duration of the data of an unknown duration.

7. The method of claim 6, further comprising:
designating a predetermined count limit;
comparing the count value with the predetermined count limit; and
updating the data of an unknown duration to the data of a known duration based on the count value exceeding the predetermined count limit.

8. The method of claim 1, wherein the first node comprises a computer system transmitting the data and the second node comprises a computer system receiving the data flow.

9. The method of claim 1, wherein the transferring of the data of an unknown duration from the second network adaptor port card to the first network adaptor port card comprises:
determining a bandwidth limit for the first network adaptor port; and
determining whether the bandwidth limit is exceeded when the data of an unknown duration is transferred from the second network adaptor port card to the first network adaptor port card,
wherein based on the bandwidth limits being exceeded, the data of an unknown duration is transferred from the second network adaptor port card to a third network adaptor port card associated with the network adaptor device, and
wherein based on the bandwidth limits not being exceeded, the data of an unknown duration is transferred from the second network adaptor port card to the first network adaptor port card.

10. The method of claim 1, wherein the determined energy consumption values for each network adaptor port card and each network switch port card located along the energy efficient route are measured by an energy metering integrated circuit (IC) device associated with each network adaptor port card and each network switch port card.

11. The method of claim 1, wherein the first node comprises a computer data center that sends the data flows.

12. The method of claim 1, wherein the second node comprises a computer data center that receives the data flows.

13. A method of managing data flow in a communication network, comprising:
assigning, along a communication route, a predetermined total energy consumption limit for a network adaptor device having a first and a second network adaptor port card, the communication route transmitting data between a first and a second node within the communication network;
determining, along the communication route, a total energy consumption value for the network adaptor device based on the transmitted data;
comparing the assigned total energy consumption limit with the determined total energy consumption value of the network adaptor device;
determining the transmitted data as being one of data of a known duration and data of an unknown duration based on the comparing resulting in the determined total energy consumption value exceeding the assigned total energy consumption limit;
transferring the data of a known duration from the first network adaptor device to the second network adaptor device; and
powering off the first network adaptor device.

14. The method of claim 13, wherein the data of a known duration comprises at least one of known data (KD) flows and long-span arbitrary data (AD-LS) flows, and wherein based on the transferring of the data classified as the data of a known duration from the first network adaptor device to the second network adaptor device, the determined total energy consumption value reduces below the assigned total energy consumption limit.

15. The method of claim 1, wherein the network adaptor device resides within an input/output (I/O) cage.

16. The method of claim 1, wherein the communication network comprises a storage area network (SAN).

17. The method of claim 13, further comprising:
assigning, along a communication route, a total energy consumption limit for a switch device having a first switch port card and a second switch port card, the communication route transmitting data between a first and a second node within the communication network;
determining, along the communication route, a total energy consumption value for the switch device based on the transmitted data;
comparing, at the switch device, the assigned total energy consumption limit with the determined total energy consumption value;
determining the transmitted data as being one of data of a known duration and data of an unknown duration based on the comparing resulting in the determined total energy consumption value exceeding the assigned total energy consumption limit;

transferring the data of a known duration from the first switch port card to the second switch port card; and powering off the first switch port card.

18. The method of claim 17, wherein the data of a known duration comprises at least one of known data (KD) flows and long-span arbitrary data (AD-LS) flows, and wherein based on the transferring of the data classified as the data of a known duration from the first switch port card to the second switch port card, the determined total energy consumption value drops below the assigned total energy consumption limit.

19. A computer program product for managing data flow between a first node and a second node within a communication network, the computer program product comprising a computer readable storage device readable by a processing circuit and storing instructions for execution by the processing circuit for performing a method comprising:

selecting an energy efficient route for transmitting data between a first and a second node within the communication network;

determining energy consumption values for each network adaptor port card and each network switch port card located along the energy efficient route;

assigning predetermined energy consumption limits for each network adaptor port card and each network switch port card located along the energy efficient route;

comparing the determined energy consumption values with the respective assigned predetermined energy consumption limits;

determining, at a hop along the route, the data as being one of data of a known duration and data of an unknown duration based on the comparing resulting in one of the determined energy consumption values exceeding a respective one of the predetermined energy consumption limits corresponding to a first network adaptor port card of a network adaptor device at the hop;

determining a second network adaptor port card of the network adaptor device carrying the data of an unknown duration; and transferring the data of an unknown duration from the second network adaptor port card to the first network adaptor port card.

\* \* \* \* \*